United States Patent [19]

Poux et al.

[11] Patent Number: 4,806,070

[45] Date of Patent: Feb. 21, 1989

[54] ARTICLE TRANSFER APPARATUS

[75] Inventors: Christopher J. Poux, Trenton; Donald P. Sinkus, Hamilton Square, both of N.J.

[73] Assignee: General Electric Company, Schenectady, N.Y.

[21] Appl. No.: 37,658

[22] Filed: Apr. 13, 1987

[51] Int. Cl.[4] .............................. B65G 65/02
[52] U.S. Cl. .................................. 414/752; 294/65; 901/39; 901/40
[58] Field of Search ............... 294/64.1, 65, 65.5; 901/40, 7, 37, 39; 414/737, 744 B, 752, 744 C, 627, 589, 72; 269/21, 329, 908

[56] References Cited

U.S. PATENT DOCUMENTS

| 3,102,751 | 9/1963 | Noble et al. | 294/65 |
|---|---|---|---|
| 3,166,202 | 1/1965 | Arnold | 294/65 |
| 3,976,205 | 8/1976 | Göransson | 294/64.1 X |
| 4,129,328 | 12/1978 | Littell | 294/65 |
| 4,183,427 | 1/1980 | Tomikawa | 414/752 X |
| 4,266,905 | 5/1981 | Birk et al. | 901/45 X |
| 4,557,655 | 12/1985 | Berg | 901/7 |
| 4,627,785 | 12/1986 | Monforte | 901/39 X |
| 4,669,168 | 6/1987 | Tamura et al. | 901/7 X |
| 4,670,974 | 6/1987 | Antoszewski et al. | 901/7 X |

FOREIGN PATENT DOCUMENTS

| 45174 | 2/1982 | European Pat. Off. | 901/47 |
|---|---|---|---|
| 2529431 | 1/1977 | Fed. Rep. of Germany | 294/65 |
| 2576005 | 7/1986 | France | 901/40 |
| 141126 | 4/1980 | German Democratic Rep. | 901/37 |
| 632564 | 11/1978 | U.S.S.R. | 901/40 |
| 753771 | 8/1980 | U.S.S.R. | 294/64.1 |
| 761411 | 8/1980 | U.S.S.R. | 294/64.1 |
| 1192971 | 11/1985 | U.S.S.R. | 901/39 |
| 1229047 | 5/1986 | U.S.S.R. | 901/39 |
| 1247267 | 7/1986 | U.S.S.R. | 901/39 |

OTHER PUBLICATIONS

*RCA Engineering Drawing*: This illustrates equipment in use by RCA, assignee of the present invention, more than 1 year prior to the filing of the instant application.

Primary Examiner—Robert J. Spar
Assistant Examiner—Donald W. Underwood
Attorney, Agent, or Firm—William Squire; James C. Davis, Jr.; Paul R. Webb, II

[57] ABSTRACT

An article transfer apparatus for transferring and assembling a television receiver back cover from a conveyor to a receiver cabinet. The apparatus is robotically operated and includes a set of pneumatically operated suction cups which are aligned to displace along axes which intersect at a common point to avoid torquing and misorienting the cover during the transfer. Vacuum is applied to the cups to assist in gripping the cover and for sensing a misgripped status. A fail-safe system locks the grip on the cover in case of power failure.

8 Claims, 4 Drawing Sheets

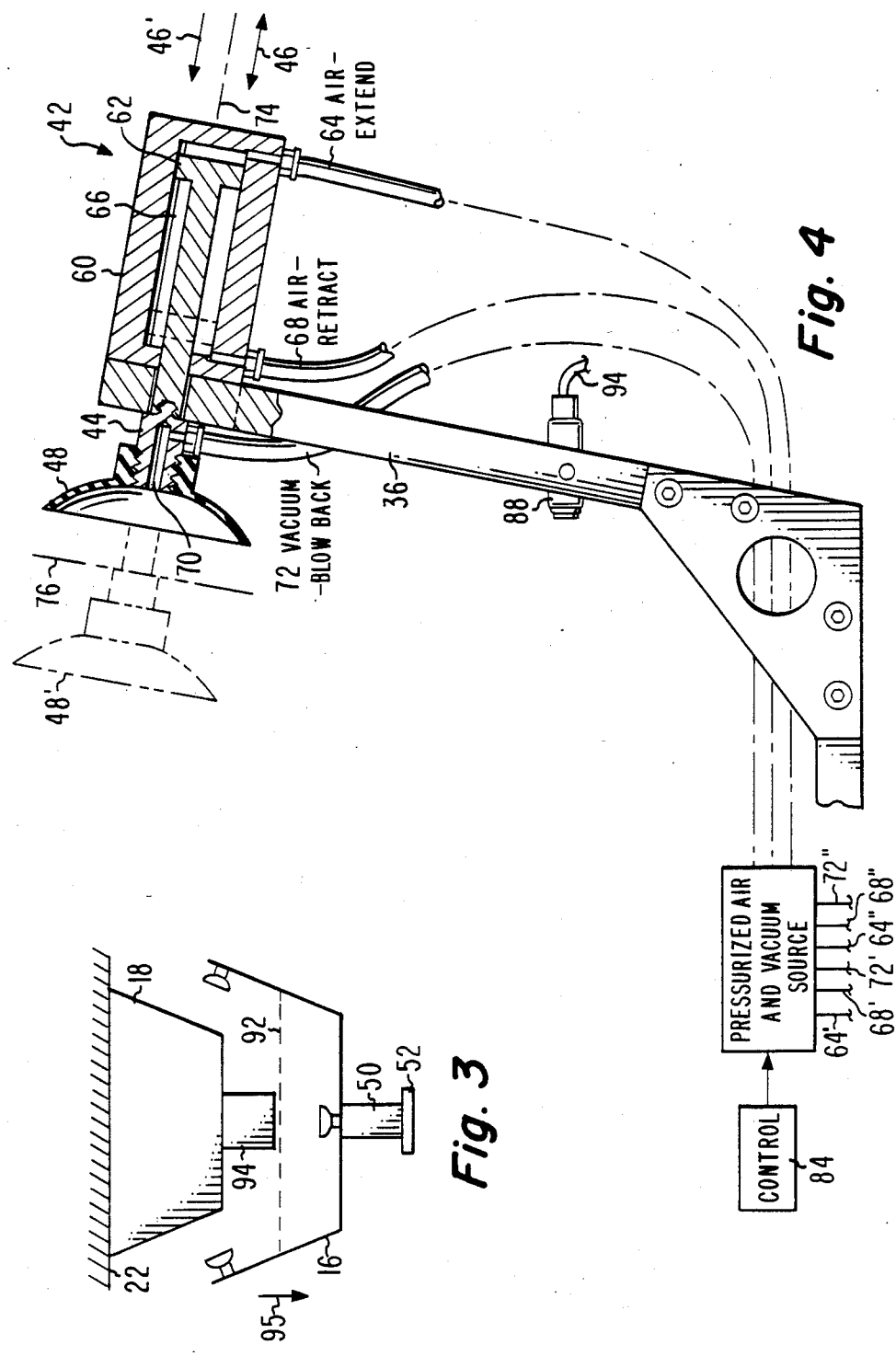

ARTICLE TRANSFER APPARATUS

This invention relates to an apparatus for gripping an article and transferring it from one station to another.

The use of suction cups or other gripping devices on article transfer mechanisms are known. However, a problem occurs with articles of irregular shapes, such as television receiver back covers and similar structures. These structures have surfaces which are at different angles relative to each other. Also, in one implementation it is desirable that such back covers of different dimensions and sizes be transferred by a single apparatus. The problem becomes amplified when it becomes important to transfer the article to a given orientation and alignment with a robotic pick up device. To assemble a television receiver back cover to its mating receiver cabinet requires a relatively critical alignment and orientation of the back cover. Further, in an automatic assembly, it is important that the back cover not only be properly oriented during positioning, but also properly assembled to the mating structure. In this assembly the cover is relatively large and needs to remain in place until secured by fasteners later in the process. If for some reason the cover is improperly attached prior to fastening then it needs to be properly attached or replaced. This potential misassembly of the back cover to the mating structure can be relatively costly if discovered downstream in the assembly process.

Pistons implemented for use with suction cups or other gripping structures can create problems in robotic gripping systems. The gripping devices when actuated by pistons, tend to torque the gripped structure, which torque tends to misalign the gripped structure. Normally, pistons have a given forward and rearward stop position. To employ suction cups or other gripping devices with such pistons requires a certain amount of piston over travel to insure positive engagement of the gripping device with the article. That over travel induces a force on the article. Multiple forces tend to torque the gripped article inducing potential misorientation.

An article transfer apparatus according to the present invention comprises a support and a plurality of spaced actuating means secured to the support. Each actuating means has an extended and retracted state and includes a member displaceable by that actuating means along a corresponding axis. The axes intersect substantially at a common point spaced from the support. A gripping device, e.g., a suction cup, is secured to each of the members and faces the common point for gripping an article located on the axes when the actuating means are extended. By aligning the gripping devices along axes which intersect at a common point, the forces of the actuating members intersect at that common point and tend to preclude misorientation and misalignment of the gripped article.

In the drawing:

FIG. 3 is a diagrammatic elevation view of the gripper apparatus of FIG. 2 useful in explaining certain principles of the present invention;

FIG. 4 is a side sectional elevation view of a representative gripper of the apparatus of FIG. 2.

Figure 1:
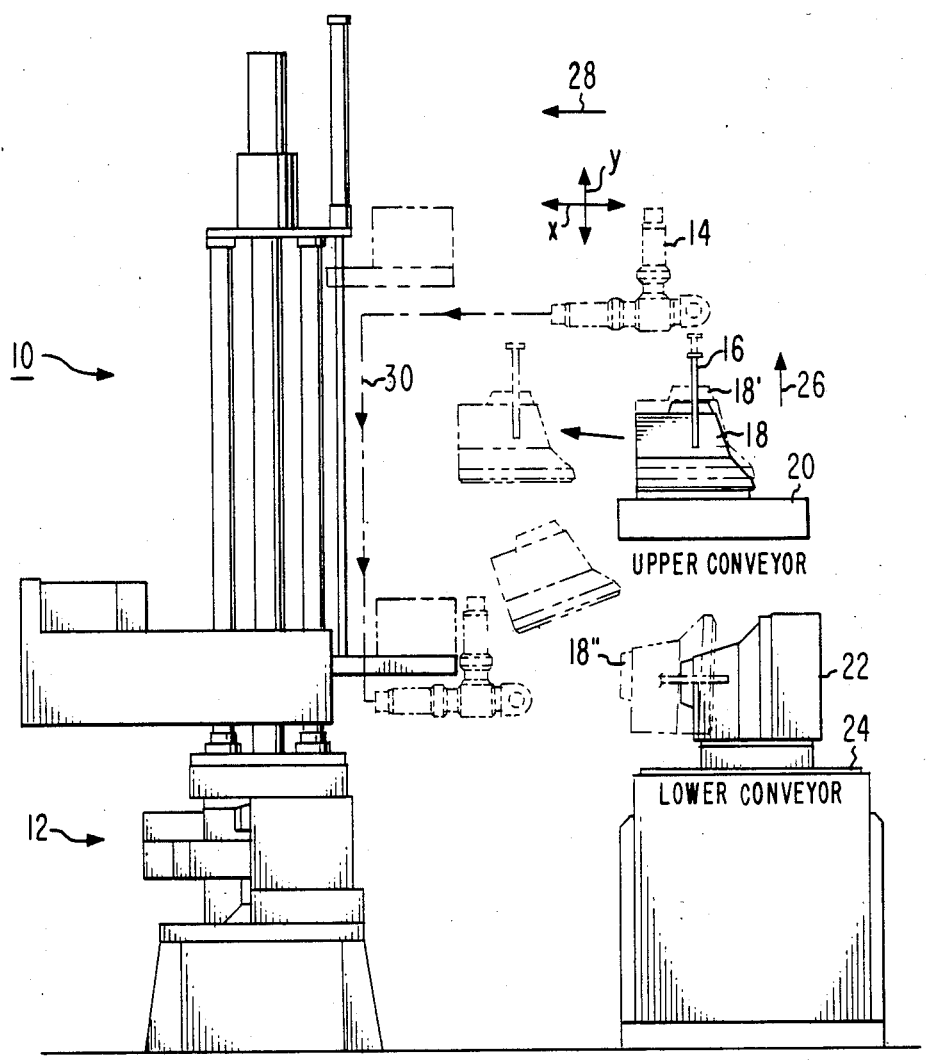
FIG. 1 is a side elevation view, partially schematic, of a robotic article transfer system according to one embodiment of the present invention.

In FIG. 1, robot 10 includes a base 12 and a manipulator 14 (shown in phantom). The manipulator 14 is moved in the vertical y directions and the horizontal x directions. Attached to the manipulator 14 is an article transfer apparatus 16, according to one embodiment of the present invention.

The transfer apparatus 16 picks up any one of a number of differently configured television receiver back covers 18, 18', and so forth, of different sizes and dimensions as shown in phantom. The covers are conveyed on an upper conveyor 20. The back covers 18, 18' of different sizes may be intermixed as they are passed by the conveyor 20 in a direction perpendicular to the plane of the drawing into the drawing FIGURE to the station at which the robot 10 is located. A mechanism (not shown) locates the back cover 18 at the workstation and identifies for the robot 10 the size and configuration of the back cover then being assembled.

The back cover 18 is to be assembled to the rear of a receiver cabinet 22 conveyed by lower conveyor 24. Conveyor 24 positions receiver cabinet 22 at a given location and orientation at the workstation of robot 10 for receiving the back cover 18 to be assembled thereto by the manipulator 14.

Robot 10 includes a commercially available computer program operated controller (not shown) for operating the manipulator 14 and the article transfer apparatus 16. The manipulator 14 then positions the gripping apparatus 16 over the back cover 18 rear. The cover 18 opening at this time is facing upper conveyor 20. The manipulator lowers apparatus 16 in a y direction, where it grasps and then lifts the back cover in direction 26 and displaces the back cover in an x direction 28. The manipulator 14 then follows path 30, illustrated in phantom, moving the back cover in a path shown by the back covers in phantom rotating the back cover 90° to the orientation of back cover 18''. The cover is then moved in an x direction and attached to receiver cabinet 22. The cover opening at this time faces the cabinet 22 90° from its initially conveyed orientation.

It is important that the back cover 18, when it is positioned to mate with the cabinet 22, is exactly aligned with cabinet 22 and that it is properly assembled to the cabinet 22 and is not ajar or otherwise loose. Therefore, it is important that the back cover 18 not be misaligned by the manipulator 14 or the gripping apparatus 16 during the gripping and transfer process. It is also important to detect that the cover 18'' is properly assembled before the cabinet 22 is conveyed onto the next workstation and a new cabinet positioned at this workstation.

Figure 2:
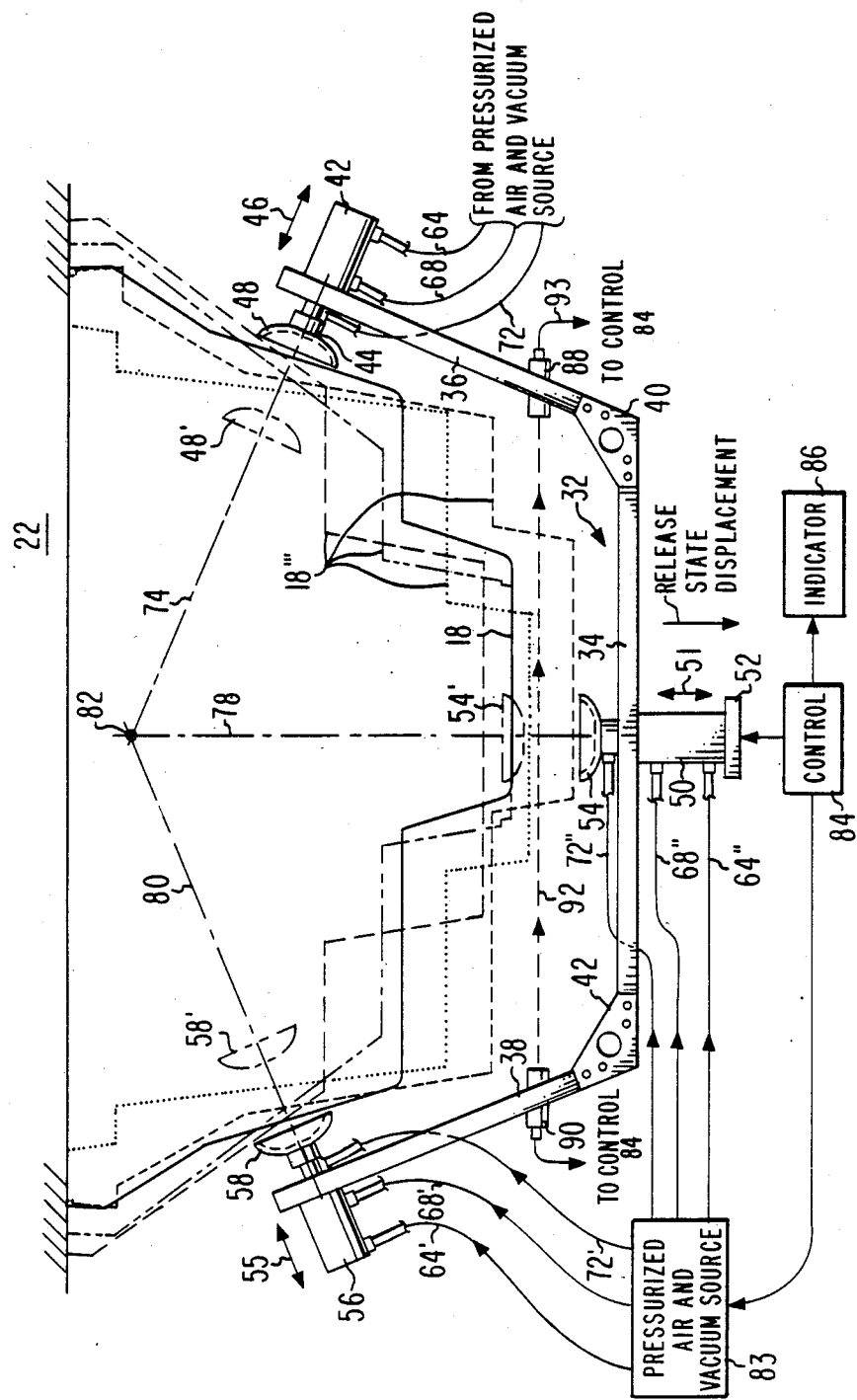
FIG. 2 is a side elevation view of the gripper apparatus, partially diagrammatic, employed in the embodiment of FIG. 1.

The gripping apparatus 16 for accomplishing these objectives is shown in FIG. 2. In FIG. 2, apparatus 16 includes a support structure 32 which comprises three arms 34, 36, and 38. The arms are preferably lightweight hollow metal beams, formed from a material such as aluminum. Arm 36 is attached to arm 34 by a pair of gussets 40 (one being shown). Arm 38 is attached to arm 34 by a like set of gussets 42. Arms 36 and 38 are attached to arm 34 at the arm 34 ends in mirror image facing relation at an angle suitable for gripping a family of back covers of somewhat different dimensions and shapes but of overall general, common design. For example, back cover 18 is shown in solid and a number of other back covers 18''' are shown in phantom. The gripping apparatus 16 can grip all of the back covers 18 and 18''' without any need for further adjustment.

Secured to arm 36 is cylinder 42 which displaces pliable suction cup 48, shown retracted, in directions 46. The suction cup 48 is extended as shown in phantom at 48'. A similar cylinder 50 is secured centrally on arm 34. The cylinder 34 housing is secured to an end effector coupler 52 for attachment to the manipulator 14, FIG. 1. Suction cup 54 is displaced by cylinder 50 in directions 51, the suction cup being shown retracted. The extended state of suction cup 54' is shown in phantom. A third cylinder 56 is secured to arm 38 and has a suction cup 58 which displaces in directions 55 and is shown retracted. The extended state of cylinder 56 positions suction cup 58' as shown in phantom.

The cylinders are operated by pressurized air from source 83 in response to a control signal from control 84. Control 84 also selects a vacuum or pressurized air from source 83 to be applied to lines 72, 72', and 72'' coupled to respective cylinders 42, 56, and 50. Control 84 also selectively and simultaneously applies pressurized air to lines 64, 64', and 64'' or to lines 68, 68', and 68'' coupled to respective cylinders 42, 56, and 50. Pressurized air on lines 64, 64', and 64'' simultaneously places the corresponding cylinders 42, 56, and 50 in the extend mode and pressurized air on lines 68, 68', and 68'' places the corresponding cylinders in the retract mode.

In FIG. 4, representative cylinder 42 which is of similar construction to cylinders 50 and 56, is given by way of example. Cylinder 42 comprises a cylinder housing containing a piston 62. Pressurized air line 64 couples the source of pressurized air 83 to one end of cylinder chamber 66 to extend piston 62 in direction 46'. A second pressurized air line 68 couples the source 83 to chamber 66 for retracting piston 62. Coupling 44 secured to piston 62 is threaded at one end to suction cup 48. The center of suction cup 48 has an aperture 70 which is coupled by coupling 44 to hose line 72. Hose line 72 receives a vacuum or pressurized air from source 83 in accordance with a given sequence, as will be explained below.

The vacuum is applied to aperture 70 when the suction cup 48 is in a gripping mode. Pressurized air in a blow-back mode is applied to line 72 when the cup is to be released from the article being gripped. An air stream is directed through aperture 70 to assist in releasing the suction cup from the gripped cover. The piston 66 displaces in directions 46 on axis 74. The phantom line 76 represents the position of a back cover during the gripping mode. This position is about midway between extremities of the piston stroke. The position of the different back covers relative to the retracted and extended states of the suction cup 48 is important, as will be explained, and are all similarly located relative to line 76.

In a similar manner, in FIG. 2, the cylinder 50 extends and retracts its suction cup 54 on axis 78 and cylinder 56 extends and retracts its suction cup 58 on axis 80. Each of the cylinders 50 and 56 include similar air lines such as lines 64'', 68'', and 72'' and 64', 68' and 72', respectively, coupled thereto. A vacuum is applied simultaneously to each of the suction cups 48, 54, and 58, as is the pressurized blow back air during the release mode via lines 72, 72', and 72''. The blow back air also clears out the vacuum forming system, as will be explained later, and the corresponding lines to each of the remaining suction cups.

It is important that the suction cups each axially extend along their corresponding axes 74, 78, and 80, FIG. 2, which intersect at common point 82. The reason for this intersection at a common point is that each of the suction cups have a tendency to be extended to the position shown in phantom at 48', 54', and 58' which is beyond the cover surface being gripped. Should their corresponding axes not intersect at point 82 but be spaced therefrom, then the corresponding cylinders 42, 50, and 56 pistons, because of their over-travel arrangement would tend to apply a torque to the gripped back cover and misorient it. Such a misorientation is highly undesirable for reasons explained above.

Further, the position of the suction cups 48 and 58 is such that they have a common mating surface on each of the back covers 18, 18''' to be attached thereby, without further adjustment or alignment of the apparatus 16. Thus, a single apparatus construction without further adjustment can attach randomly any back cover 18, 18''' regardless its design configuration. The reason for this flexibility of gripping is as follows. The cups 48 being made of rubber or other pliable material have a sufficient depth in a direction along the corresponding axes 74, 78, and 80 such that the suction of the respective cups is maintained regardless of the differences in angles of the mating surfaces of the back covers to be gripped thereby. As long as the cups remain concave and are not forced into an inverted convex configuration, then the suction within the cup remains.

The mating surfaces of the back covers are all planar so as to provide good gripping by the suction cups. However, because the forces exerted by each of the pistons intersects the common point 82 and the cups abut the solid structure of the respective back covers, the cups cannot extend beyond the position of their forced contact with the mating back cover surfaces. Thus, the cups all remain in forced contact by the corresponding pistons due to the tendency of the pistons to extend beyond the surface of the back cover along their corresponding axes. Therefore, the relative alignment of the back covers is maintained regardless the back cover design.

Control 84 operates the manipulator 14 (FIG. 1) coupled to coupler 52 for orienting apparatus 16 to grasp back cover 18. A computer program in control 84, a commercial controller available with robot 10 (FIG. 1), programs the manipulator 14 to place the suction cups adjacent the respective back cover 18, FIG. 1, and operates the respective cylinders to grip the back cover when so aligned. The manipulator 14 is then moved along the path 30 and assembles the back cover to the receiver cabinet 22, as described above.

A problem, however, is that it is also desirable that should a back cover 18'', FIG. 1, be assembled improperly to the cabinet 22, that this condition be detected as soon as possible. A detection system, FIG. 2, for this purpose includes indicator 86 coupled to control 84. To so sense the misassembly of the back cover, a sensor system comprising emitter 90 and sensor 88 is coupled to respective arms 38 and 36. Emitter 90 emits a light beam 92 which impinges upon sensor 88 which then produces a signal on wire 93 in response to the incident beam. Control 84 powers sensor 90 for producing beam 92. The beam 92 is located such that it is always interrupted by any gripped back cover.

In FIG. 3, the beam 92 is positioned by moving the apparatus 16 a small distance away from the previously assembled cover in direction 95 so that the beam just clears cover portion 94 of a properly assembled cover 18. Should the cover 18 be loose, misaligned or misoriented relative to the cabinet 22 after assembly thereto, then cover portion 94 tends to interrupt beam 92. That interruption is sensed by sensor 88 (FIG. 2). Control 84, in response to that signal on line 93 representing the sensed condition indicates cover 18 misalignment. At this time, an operator manually assembles the cover to the cabinet. Control 84 stops the automatic system at this time causing conveyors 20 and 24, FIG. 1, to remain stationary during this time interval. Control 84 may also sound an alarm or other signal to alert the operator. The operator then manually activates the automatic sequence via a control 84 switch after the cover is properly assembled.

Figure 5:
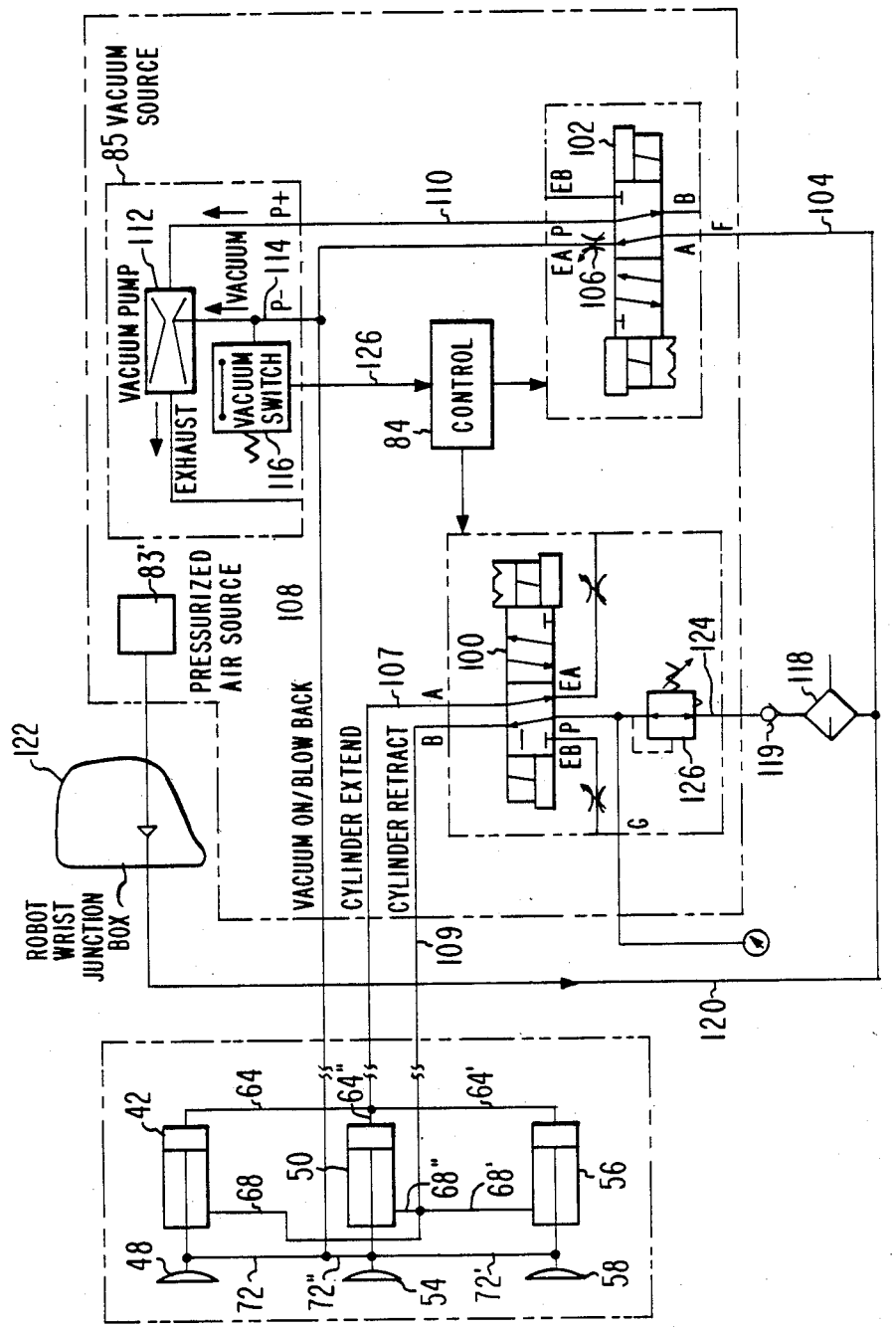
FIG. 5 is a pneumatic flow chart of a system employed with the embodiment of FIG. 1.

In FIG. 5, a pneumatic system for operating the gripping apparatus 16 includes pressurized air source 83' and a vacuum source 85. Pressurized air from source 83' is applied to valve 100 via line 120, air lubricator 118, check valve 119, and pressure regulator 126. Air from valve 100 is applied to line 107 and then to lines 64, 64', and 64" (shown coupled to an exhaust) to extend the cylinders. Valve 100 applies air to line 109 in the other valve state to retract the cylinders. Valve 100 provides pressurized air to respective lines 64, 64', and 64", and 68, 68', and 68" for extending or retracting the cylinders. Lubricator 118 lubricates these lines as lubricant in the air at source 83' is removed to preclude clogging the vacuum system.

Air from line 120 also flows to line 104 through valve 102 and then through flow restrictor 106 into line 108. Line 108 supplies pressurized blow back air to lines 72, 72', 72" coupled to the different suction cups. Valve 102, when switched states, applies pressurized air to line 110 from line 104. The pressurized air flows through Venturi vacuum pump 112 of source 85 to an exhaust, creating a vacuum on line 114. The vacuum on line 114 is sensed by vacuum switch 116 which produces a signal which is applied to control 84 via line 126.

Control 84 in response to that signal keeps the grippers in suction contact with the cabinet until the vacuum on line 114 is of sufficient given threshold magnitude. In other words, the manipulator 14 of FIG. 1 does not move if the vacuum is insufficient. The vacuum on line 114, FIG. 5, is fed via line 108 to lines 72 to the different suction cups during the gripping portion of the cycle. At this time, when the suction cups are gripping the cover, the signal on wire 126 when the desired vacuum is reached indicates proper gripping of the cover. The vacuum is important to aid the gripping action. Without proper gripping, the vacuum on line 108 is unable to reach its threshold value. In this case, controller 84 senses this condition via the signal received on wire 126 and stops the process. An improperly gripped cover could be a hazard.

In operation of the pneumatic system, FIG. 5, pressurized air is supplied line 120 from pressurized air source 83' via the robot wrist junction box 122. The cylinders are initially in the retracted state. At this time pressurized air is applied via line 104 through valve 102 and flow restrictor 106 to line 108 to each of the suction cups 48, 54, and 58 clearing the lines and the suction cups. When it is desired to grip a back cover, control 84 moves the manipulator 14, FIG. 1, in position to grip the next cover. Control 84 then switches the states of valves 100 and 102, and pressurized air is applied to lines 107 and 110. The pressurized air on line 107 extends the cylinders 42, 50, and 56 and pressurized air on line 110 is supplied through the Venturi of pump 112 to exhaust. The high pressure air flow through the Venturi pump 112 tends to create a vacuum on lines 114 and 108 and at the concave volumes of each of the suction cups 48, 54, and 58.

When the cover is gripped, control 84 is programmed to sense the vacuum on line 114 via the signal on line 126. Control 84 precludes removing the back cover from the upper conveyor 20, FIG. 1, if the vacuum is not sensed, implying an improperly gripped cover.

The significance of the vacuum switch 116 is that unless all three suction cups are sealed against the back cover during the gripping process, the vacuum on line 108 is not achieved and the assembly will not proceed via control 84. If sufficient vacuum leaks are present in the system, control 84 senses this via the signal from vacuum switch 116 and the assembly does not proceed. Further, the vacuum switch 116 will sense a loss of air pressure to the workstation because the vacuum on line 114 is created by the pressurized air on line 110. Thus, in the case of pressurized air loss, control 84 will sense this and not proceed with the assembly. Further, if foreign objects interfere with the action of the suction cups or if the back cover is improperly aligned at the time it is gripped, so that the suction cups do not achieve proper sealing, the vacuum will not be achieved and the lack of vacuum again will be sensed by switch 116. Thus, the vacuum switch 116 serves an important function for monitoring proper operation of the pneumatic system. If the back cover being assembled is of improper design or orientation such that the suction cups will be unable to engage the cover or part properly, a vacuum will not be achieved and the signal produced by the switch 116 will cause control 84 to stop the process.

The valves 100 and 102 are double detented solenoid spool type devices which, by construction, preclude each valve from changing state if the electrical power operating the valve is lost. Thus, if power is lost or turned off inadvertently, the air pressure to cylinders 100 and 102 and the vacuum, if present on line 108, will not be reversed and, therefore, the grip on the back cover will remain. This is important because in an automatic assembly, occasional loss of power, if it should cause the robot to lose its grip on the gripped back cover, could be hazardous when power returns.

Check valve 119 between pressure regulator 126 and lubricator 118 precludes air cylinders 42, 50 and 56 from relaxing or retracting in the event of loss of air pressure. Retraction of the cylinders tends to release the grip of the suction cups on the back cover. Thus, once the system is pressurized, check valve 119 precludes the cylinder retract-extend system from losing its grip.

The flow control restrictor 106 serves an important function in metering the amount of air volume blown through the vacuum line 108. This metering function minimizes costly wasted compressed air and minimizes environmental noise due to pressurized air blowing through restricted orifices. Further, air is not blown directly back through the exhaust of the Venturi pump 112 but into the vacuum line exterior pump 112. This arrangement permits air to pass through the vacuum pump Venturi in a normal direction. Reverse flow through the exhaust into the Venturi causes high frequency noise which is environmentally undesirable.

During the gripping cycle the back cover is rigidly held across the top and against the conveyor 20 nearest the robot in FIG. 1. The robot 10 positions the gripper apparatus 16 over the back cover. At that time, valves 100 and 102, FIG. 5, are actuated. The air pressure in the gripper cylinders 42, 50, and 56 causes pressure to build at the cap end of the three gripper cylinders. In the interim, the front of the cylinders are vented to the atmosphere via valves 100 and 102. This action extends the cylinders and pushes the vacuum cups against the back cover at three positions. Simultaneously, air pressure passes through the Venturi pump 112 which causes the vacuum to be drawn to the pumps vacuum port. The robot wrist does not displace the back cover off the conveyor until the vacuum switch threshold is reached. When this occurs, the wrist is operated and the robot passes through the programmed steps until the back cover is placed onto the previously located receiver 22.

At this time, solenoid valves 100 and 102 are energized (by means not shown) to return to the state depicted in FIG. 5. Vacuum is released due to the pressurized air flow through line 108. Simultaneously therewith the cylinders are retracted due to pressurized air flow to line 109. Meanwhile, the rear of the cylinders are vented to the atmosphere via line 107.

All of the structural elements of the apparatus 16 of FIG. 3 are made of lightweight aluminum and low weight gripper components to minimize inertial loads on the robot wrist at coupler 52. The cylinder 50 serves also as a structural connecting member linking robot wrist coupler 52 to the arms 34, 36, and 38.

What is claimed is:

1. An article transfer apparatus comprising:
    a support;
    a plurality of spaced actuating means secured to the support, each having extended and retracted states and including a member displaceable along a corresponding axis, said axes intersecting substantially at a common point spaced from said support, said point lying in a plane; and
    a gripping member secured to each displaceable member and facing said common point in a operating position for gripping an article located on said axes when said actuating means are extended, each gripping member lying spaced from and facing the same side of said plane;
    said support comprising a base member and a pair of spaced legs secured to the base member to form a U-shaped structure, a separate actuating means secured to each of said legs spaced from said base member and to said base member, said actuating means lying in a plane; a first element secured to one of said legs for emitting a light beam to the other of said legs, said beam being normal to the axis of said base member actuating means, and beam sense means secured to the other of said legs in the path of said beam for generating a control signal in response to said beam impinging thereon.

2. The apparatus of claim 1 wherein said axes are aligned coplanar.

3. The apparatus of claim 1 wherein said gripping member includes a suction cup, said apparatus further including vacuum forming means coupled to said gripping member for selectively evacuating said cup to thereby lock the gripping member to the article, sense means for sensing the gripped state of said member and means coupled to said support and means for sensing responsive to the sensed value of the vacuum at said gripping member for indicating when the vacuum value is below a given threshold value.

4. An article transfer apparatus comprising:
    a U-shaped support having a base member and first and second legs;
    a first fluid operated piston secured to the base member arranged to displace along a first axis;
    a second fluid operated piston secured to the first leg and arranged to displace along a second axis;
    a third fluid operated piston secured to the second leg and arranged to displace along a third axis, said first, second, and third axes lying in a plane and intersecting substantially at a point;
    a suction cup secured to each said piston and facing said point; and
    control means for selectively displacing said support to respective article receiving and transfer positions and for displacing said pistons simultaneously toward and away from said point.

5. The apparatus of claim 4 wherein each said cups define a suction volume, said apparatus further including means for selectively evacuating the suction volume of each said cups in a first mode and for applying a pressurized fluid stream into said suction volume in a second mode.

6. The apparatus of claim 5 wherein said fluid is air, said apparatus including means responsive to said pressurized air for creating a vacuum and for coupling said vacuum to said cups and vacuum sense means coupled to said means for selectively evacuating for indicating the presence and absence of said vacuum.

7. The apparatus of claim 5 further including means for sensing the value of the vacuum at said suction volume and means responsive to the sensed value to retain said pistons in the position toward said point and the support in the article receive position.

8. The apparatus of claim 4 further including beam emitting means coupled to one of said legs and beam sense means secured to the other leg in the path of the beam emitted by said emitting means for generating a signal in response to said beam incident thereon, and indicating means coupled to said base means responsive to said signal for selectively manifesting the interruption of said beam.

* * * * *